(12) United States Patent
Du et al.

(10) Patent No.: US 8,879,555 B2
(45) Date of Patent: Nov. 4, 2014

(54) METHOD AND APPARATUS FOR FORWARDING PACKETS BY OBTAINING ADDRESSES OF THE PACKETS USING A PRESET FORWARDING INFORMATION BASE ENTRY

(75) Inventors: Wenhua Du, Shenzhen (CN); Rongfeng Hong, Shenzhen (CN); Yi Yi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 383 days.

(21) Appl. No.: 13/110,694

(22) Filed: May 18, 2011

(65) Prior Publication Data
US 2011/0292943 A1 Dec. 1, 2011

(30) Foreign Application Priority Data

May 26, 2010 (CN) .......................... 2010 1 0183334

(51) Int. Cl.
*H04L 12/28* (2006.01)
*H04L 12/56* (2006.01)
*H04L 12/743* (2013.01)
*H04L 12/741* (2013.01)

(52) U.S. Cl.
CPC ........ *H04L 45/7457* (2013.01); *H04L 45/7453* (2013.01); *H04L 45/74* (2013.01); *H04L 45/745* (2013.01)
USPC ........... 370/392; 370/351; 370/389; 711/100; 711/108

(58) Field of Classification Search
None
See application file for complete search history.

(56) References Cited

U.S. PATENT DOCUMENTS 5,940,597 A * 8/1999 Chung .......................... 709/242
6,438,127 B1 * 8/2002 Le Goff et al. ................ 370/389

(Continued)

FOREIGN PATENT DOCUMENTS

| CN | 1441579 A | 9/2003 |
| CN | 101021858 A | 8/2007 |
| CN | 101494603 A | 7/2009 |

OTHER PUBLICATIONS

Chinese office action for Chinese application No. 201010183334.9, dated Sep. 22, 2011, total 9 pages.

(Continued)

*Primary Examiner* — Phirin Sam
*Assistant Examiner* — Peter Chau
(74) *Attorney, Agent, or Firm* — Conley Rose, P.C.; Grant Rodolph; Nicholas K. Beaulieu

(57) ABSTRACT

The present invention relates to the field of communication technologies, and discloses a method and an apparatus for forwarding packets to solve the problems in the prior art, namely, if a long Internet Protocol (IP) address needs to be searched for at the time of forwarding a packet, the number of Ternary Content Addressable Memories (TCAMs) need to be increased, or an external Random Access Memory (RAM) needs to be accessed for more times, which leads to a high cost and low performance. The method includes: extracting a first bit sequence from a destination address of a received packet, and using the first bit sequence as a key value; searching for a preset TCAM entry by using the key value, and obtaining an index value returned by the TCAM entry; and using the index value and a second group of bits in the destination address of the packet as conditions for searching, according to a predetermined algorithm, for a preset Forwarding Information Base (FIB) entry, and obtaining a forwarding address of the packet. The technical solution under the present invention is applicable to searching a table for an Internet Protocol version 6 (IPv6) address in a router.

19 Claims, 3 Drawing Sheets

(56) References Cited

U.S. PATENT DOCUMENTS

| | | | |
|---|---|---|---|
| 6,553,002 B1* | 4/2003 | Bremer et al. | 370/254 |
| 7,792,812 B1* | 9/2010 | Carr | 707/706 |
| 7,986,696 B1* | 7/2011 | Miliavisky et al. | 370/392 |
| 2004/0100950 A1* | 5/2004 | Basu et al. | 370/389 |
| 2005/0055457 A1* | 3/2005 | Wybenga et al. | 709/238 |
| 2005/0195812 A1* | 9/2005 | Wybenga et al. | 370/389 |
| 2005/0195831 A1* | 9/2005 | Wybenga et al. | 370/395.31 |
| 2005/0281257 A1* | 12/2005 | Yazaki et al. | 370/389 |
| 2006/0167843 A1* | 7/2006 | Allwright et al. | 707/3 |
| 2006/0253606 A1* | 11/2006 | Okuno | 709/238 |
| 2008/0186970 A1* | 8/2008 | Wisener et al. | 370/392 |
| 2009/0150603 A1 | 6/2009 | Sahni et al. | |
| 2010/0020806 A1* | 1/2010 | Vahdat et al. | 370/395.31 |
| 2010/0150155 A1* | 6/2010 | Napierala | 370/390 |

OTHER PUBLICATIONS

George Varghese, "Network Algorithms: An Interdisciplinary Approach to Designing Fast Networked Devices," University of California, San Diego, 2005, total 491 pages.

Francis Zane et al., "CoolCAMs: Power-Efficient TCAMs for Forwarding Engines", IEEE INFOCOM 2003, 2003, total 11 pages.

The front page of Chinese issued patent CN101834802B, Aug. 8, 2012, 1 page only.

* cited by examiner

METHOD AND APPARATUS FOR FORWARDING PACKETS BY OBTAINING ADDRESSES OF THE PACKETS USING A PRESET FORWARDING INFORMATION BASE ENTRY

CROSS-REFERENCE TO RELATED APPLICATIONS

This application claims priority to Chinese Patent Application No. 201010183334.9, filed on May 26, 2010, which is hereby incorporated by reference in its entirety.

FIELD OF THE INVENTION

The present invention relates to the field of communication technologies, and in particular, to a method and an apparatus for forwarding packets.

BACKGROUND OF THE INVENTION

In the design of routers and switches, table lookup processing needs to be performed for data, so that the next node of a packet can be found. For example, in a usual routing device, after the forwarding engine receives an Internet Protocol (IP) packet, the forwarding engine extracts the destination IP address of the packet, and looks up a Forwarding Information Base (FIB) table for the index of the next-hop IP address. A table lookup rule usually applied now is the Longest Prefix Match (LPM) rule.

In the evolution from Internet Protocol version 4 (IPv4) to Internet Protocol version 6 (IPv6), there are two methods for implementing IPv6 LPM table lookup in the prior art: (i) a dedicated Ternary Content Addressable Memory (TCAM) is used to search for and find contents quickly; and (ii) a special lookup algorithm (such as a Trie algorithm or a B-tree algorithm) is used, and an off-chip cost-efficient Synchronous Dynamic Random Access Memory (SDRAM) or Static Random Access Memory (SRAM) is used for storing FIB entries. The principles of the Trie algorithm are as follows: An IP address is divided into multiple segments, and each segment is used to access an external Random Access Memory (RAM) for one time. The more bits an IP address is composed of, the more segments the IP address is divided into, and the more frequently the external RAM is accessed. The basic principles of the B-tree algorithm are as follows: A complete IP address is used to access the external RAM repeatedly, until the desired content is found.

In the process of implementing the present invention, the inventor finds that: An IPv6 address (composed of 128 bits) is composed of much more bits than an IPv4 address (composed of 32 bits); if method (i) mentioned above is adopted to implement IPv6 LPM table lookup, the number of TCAM chips need to be increased, and at present the TCAM chips are rather costly and consume power drastically; and if method (ii) mentioned above is adopted to implement IPv6 LPM table lookup, it is required to access the external RAM for much more times, which deteriorates the table lookup performance.

SUMMARY OF THE INVENTION

Embodiments of the present invention provide a method and an apparatus for forwarding packets, in which the cost for looking up a long IP address is reduced.

The following technical solution is adopted in embodiments of the present invention to fulfill the objectives:

A method for forwarding packets includes:

extracting a first group of bits from a destination address of a received packet, and using the first group of bits as a key value;

searching for a preset TCAM entry by using the key value, and obtaining an index value returned by the TCAM entry; and using the index value and a second group of bits in the destination address of the packet as search conditions, searching for a preset FIB table according to a predetermined algorithm, and obtaining a forwarding address of the packet.

An apparatus for forwarding packets includes:

an extracting unit, configured to extract a first group of bits from a destination address of a received packet, and use the first group of bits as a key value;

a first search unit, configured to search for a preset TCAM entry by using the key value extracted by the extracting unit, and obtain an index value returned by the TCAM entry; and a second search unit, configured to use the index value obtained by the first search unit and a second group of bits in the destination address of the packet as search conditions, searching for a preset FIB entry according to a predetermined algorithm, and obtain a forwarding address of the packet.

With the method and apparatus for forwarding packets according to embodiments of the present invention, a TCAM table is looked up for the entries that match a first group of bits in the destination address of the packet, and an index value of the TCAM entry that matches a second group of bits is obtained; the index value and the second group of bits in the destination address are used as conditions, table lookup is performed by using the index value and according to a predetermined algorithm, and the final forwarding address of the packet is obtained. Because the number of TCAMs is not increased, the cost is not increased; because the second group of bits is a part of the original destination address and is shorter than the original destination address, the algorithm-based table lookup does not increase the number of times for accessing the RAM or deteriorate the performance. With the method and apparatus for forwarding packets according to embodiments of the present invention, the TCAM table lookup and the algorithm-based table lookup are combined, and the table lookup performance is improved and the table lookup cost is reduced in searching for a long IP address.

BRIEF DESCRIPTION OF THE DRAWINGS

To illustrate the technical solution under the present invention more clearly, the following outlines the accompanying drawings involved in description of the embodiments of the present invention. Apparently, the accompanying drawings outlined below are illustrative and not exhaustive. Persons of ordinary skill in the art can derive other drawings from such accompanying drawings without any creative effort.

DETAILED DESCRIPTION OF THE EMBODIMENTS

To achieve the objectives, technical solutions and merits of the embodiments of the present invention more clearly, the following detailed description is given with reference to the accompanying drawings. Evidently, the drawings and the detailed description are merely part of, instead of all embodiments of the present invention, and the embodiments are illustrative in nature and not exhaustive. All other embodiments, which can be derived by those skilled in the art from the embodiments given herein without any creative effort, shall fall within the protection scope of the present invention.

In the prior art, if a long IP address needs to be searched for at the time of forwarding a packet, the number of TCAMs need to be increased, or the external RAM needs to be accessed for many times, which leads to a high cost and low performance. To solve such problems, the embodiments of the present invention provide a method and an apparatus for forwarding packets.

Figure 1:
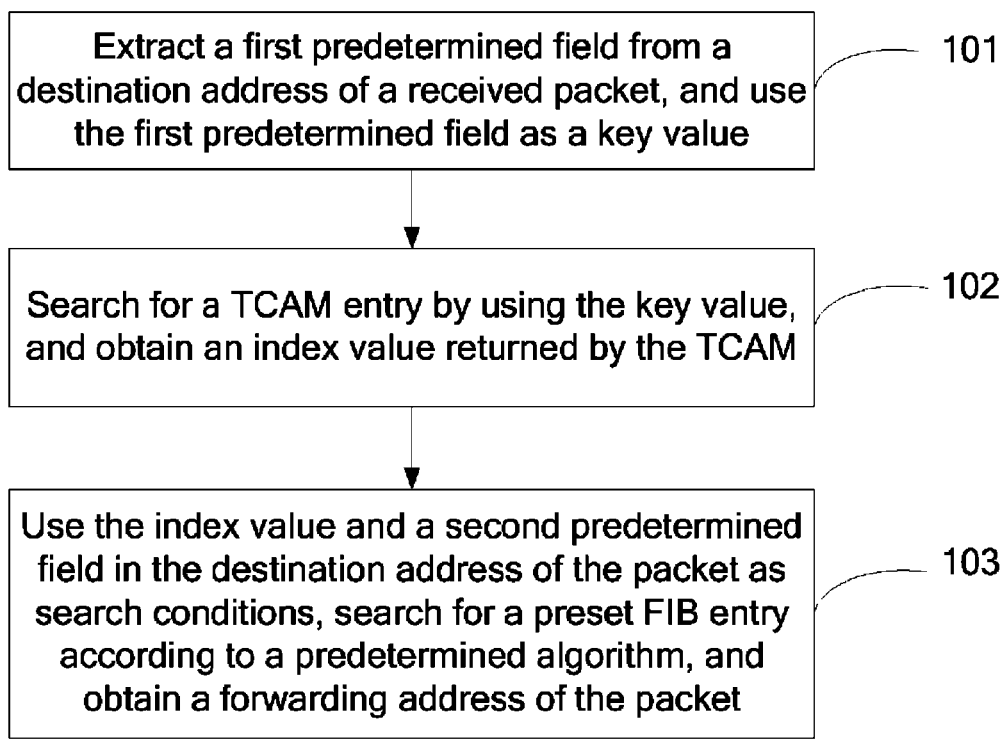
FIG. 1 is a flowchart of a method for forwarding packets according to an embodiment of the present invention.

As shown in FIG. 1, a method for forwarding packets according to an embodiment of the present invention includes:

Step 101: Extract a first group of bits from a destination address of a received packet, and use the first group of bits as a key value.

In this embodiment, the destination address of the packet is a destination IP address, or a combination of the destination IP address and a predetermined network identifier. The destination IP address is generally a 128-bit IPv6 address. The predetermined network identifier is a Virtual Private Network (VPN) identifier, and is generally composed of 16 bits. When the VPN identifier is combined with the destination IP address, the destination address in the packet is composed of 144 bits. The first group of bits in this embodiment is composed of a predetermined number of forepart bits in the destination address. For example, if the destination address is an IPv6 address composed of 128 bits, the forepart 64 bits could be selected as a key value for searching the table. Certainly, the forepart 32 bits or 16 bits or another number of forepart bits may also be selected as a key value, and are not repeated described.

Step 102: Search for a preset TCAM entry by using the key value, and obtain an index value from the TCAM entry.

In this embodiment, the preset TCAM entry may be stored in an on-chip TCAM. In other embodiments, the TCAM entry may also be stored in an off-chip TCAM. The TCAM is a hardware specially designed for searching for entries, and could provides good search performance without occupying too much capacity. The TCAM enables fast search for contents. In this embodiment, only parts, such as the forepart 64 bits, of the destination IP address (instead of the whole destination IP address as the case in the prior art) are used as a key value to search for an entry, in this way, compared with searching the whole destination IP address in the TCAM, the capacity for storing the key values in the TCAM or TCAMs is much smaller. In the foregoing method, if a TCAM entry is hit, an index value will be returned by the TCAM entry for further table lookup.

Step 103: Use the index value and a second group of bits in the destination address of the packet as search conditions, searching for a preset FIB entry according to a predetermined algorithm, and obtain a forwarding address of the packet from the FIB entry.

In this embodiment, the second group of bits refers to the rest bits except for the first group of bits in the destination address of the packet. As mentioned in step 101, if the first group of bits is the forepart 64 bits of the destination IP address, the second group of bits is the rest 64 bits of the destination IP address. The index value obtained from the TCAM entry and the last 64 bits of the destination IP address form a new key value, and a FIB entry that matches the new key value is searched for according to a predetermined algorithm to obtain the final forwarding address of the packet, namely, the index of the next-hop IP address. The FIB entry is comprised in an FIB table which is preset and stored in a RAM, and the RAM may be an on-chip RAM or an off-chip RAM, or a combination thereof. The predetermined algorithm may be a Trie algorithm, and may also be a B-Tree algorithm.

In this embodiment, the FIB entry may be searched for in two methods. Method 1 is: using the index value returned by the TCAM entry and the last 64 bits of the destination IP address to form a new key value (referred to as a second key value), and using the second key value to look up the FIB table for FIB entries and obtain the final forwarding address of the packet. In this method, the index value returned by the TCAM entry is generally composed of 16 bits. Method 2 is: using the index value returned by the TCAM entry as a parameter which limits a scope for searching for FIB entries. In this case, the last 64 bits of the destination IP address directly form a key value (referred to as a third key value), and the FIB entries are searched for in the scope mentioned above, to obtain the final forwarding address of the packet.

Further, in this embodiment, if no TCAM entry is hit in the first attempt of looking up the table, the whole field of the destination IP address forms a key value, a FIB entry that is directly searched for in the RAM by using the key value, according to a Trie algorithm or a B-Tree algorithm. In this way, the forwarding address of the packet is obtained.

With the method for forwarding packets according to embodiments of the present invention, a TCAM table is looked up for the entries that match a first group of bits in the destination address of the packet, to obtain an index value and a table is looked up by using the index value and a second group of bits in the destination address of the packet, and the final forwarding address of the packet is obtained. With the method for forwarding packets provided in this invention, key values are extracted from the destination address of the packets and searched for in different tables. Compared with storing the whole destination address and the forwarding address in only one table, storing the information in different tables with simple index value occupy much smaller capacity, and the requirement for the TCAMs itself is lowered. The method for forwarding packets in this embodiment combines the TCAM table lookup with the algorithm-based table lookup, and improves the table lookup performance and reduces the table lookup cost in searching for a long IP address.

Figure 2:
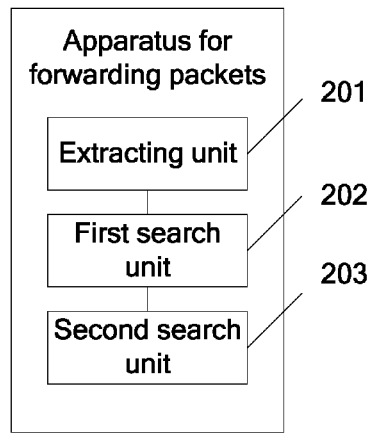
FIG. 2 is a first schematic diagram of a structure of an apparatus for forwarding packets according to an embodiment of the present invention.

As shown in FIG. 2, an apparatus for forwarding packets according to an embodiment of the present invention includes an extracting unit 201, a first search unit 202, and a second search unit 203.

The extracting unit 201 is configured to extract a first group of bits from a destination address of a received packet, and use the first group of bits as a key value. In this embodiment, the destination address of the packet is a destination IP address, or a combination of the destination IP address and the predetermined network identifier. The predetermined field is composed of a predetermined number of forepart bits in the destination address.

The first search unit 202 is configured to search for a preset TCAM entry by using the key value extracted by the extracting unit 201, and obtain an index value returned by the TCAM entry. In this embodiment, the preset TCAM entry may be on an on-chip TCAM, and may also be on an off-chip TCAM.

The second search unit 203 is configured to use the index value obtained by the first search unit 202 and a second group of bits in the destination address of the packet as search conditions, searching for a preset FIB entry according to a predetermined algorithm, and obtain a forwarding address of the packet. In this embodiment, the result returned by the TCAM entry is an index value for searching for the FIB entries; and the preset FIB entry is stored in an on-chip RAM or an off-chip RAM.

Figure 3:
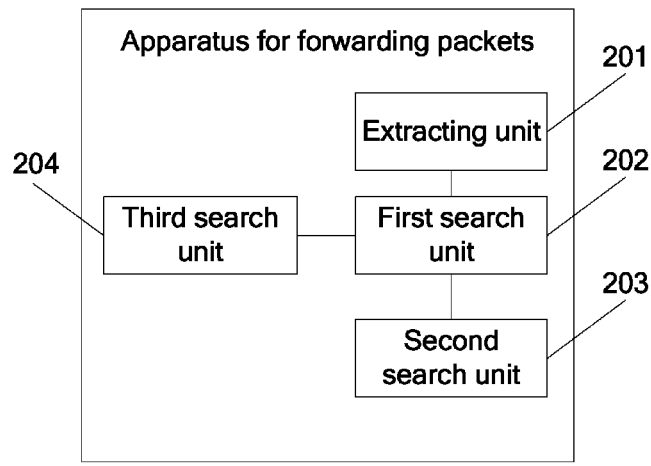
FIG. 3 is a second schematic diagram of a structure of an apparatus for forwarding packets according to an embodiment of the present invention.

As shown in FIG. 3, the apparatus further includes:

a third search unit 204, configured to: when no TCAM entry is hit, use the complete field of the destination address as a key value, search for a preset FIB entry by using the complete field of the destination address and according to a predetermined algorithm, and obtain the forwarding address of the packet.

It should be noted that, if no TCAM entry is hit and the second search unit supports both modes (the mode of using a complete IPv6 address as a key value, and the mode of using the remaining bits of an IPv6 address as a key value), the second search unit may search for a preset entry by using the complete field of the destination address and according to a predetermined algorithm.

Figure 4:
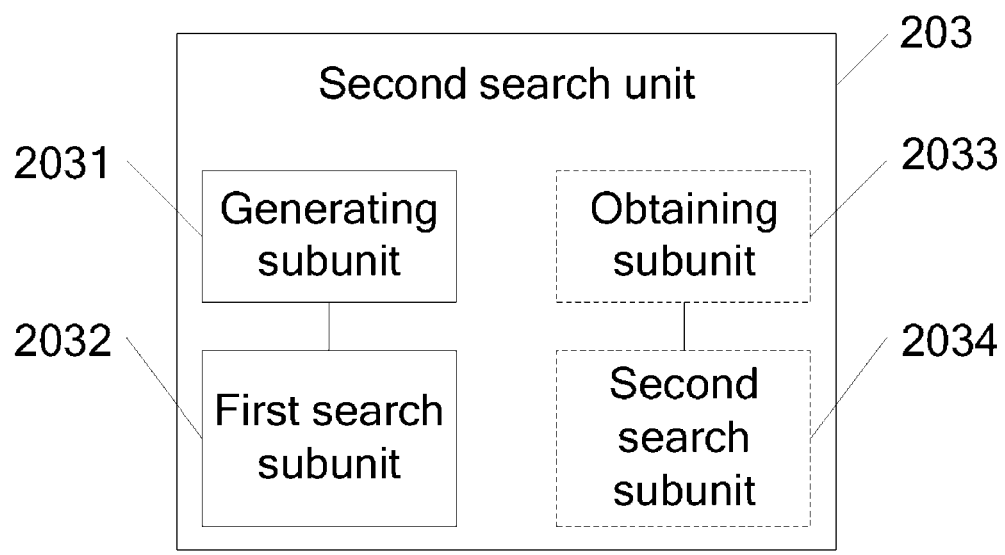
FIG. 4 is a second schematic diagram of a structure of a second search unit 203 in an apparatus for forwarding packets according to an embodiment of the present invention.

Further, as shown in FIG. 4, the second search unit 203 includes:

a generating subunit 2031, configured to combine the index value obtained by the first search unit 202 and a second group of bits in the destination address of the packet to form a second key value; and a first search subunit 2032, configured to search for a FIB entry by using the second key value generated by the generating subunit 2031 and according to a predetermined algorithm, and obtain the forwarding address of the packet; or an obtaining subunit 2033, configured to obtain, according to the index value obtained by the first search unit 202, a scope for searching for FIB entries; and a second search subunit 2034, configured to: use a second group of bits in the destination address of the packet as a third key value, search for the FIB entry according to the predetermined algorithm in the scope obtained by the obtaining subunit 2033 for a FIB entry, and obtain the forwarding address of the packet.

In this embodiment, the predetermined algorithm is a Trie algorithm or a B-Tree algorithm.

For the detailed implementing modes of the units in the apparatus above, see steps 101-103 in the method embodiment above.

With the apparatus for forwarding packets according to embodiments of the present invention, a TCAM table is looked up for the entries that match a first group of bits in the destination address of the packet, to obtain an index value of the second group of bits, and a table is looked up by using the index value and according to an algorithm, and the final forwarding address of the packet is obtained. Because the number of TCAMs is not increased, the cost is not increased; because the second group of bits is a part of the original destination address and is shorter than the original destination address, the algorithm-based table lookup does not increase the number of times for accessing the RAM or deteriorate the performance. In this embodiment, according to the hierarchical characteristics of "IPv6 combinable global unicast address", a certain number (N) of IPv6 routes whose mask length is greater than 64 bits can be combined into one IPv6 route whose length is 48 bits or 64 bits. In this way, the N routes occupy only one entry (N:1 convergence) in the first table lookup, and occupy N entries in the second table lookup unit, but each entry is shorter than the complete IPv6 entry composed of 128 bits (for example, the remaining entry is composed of 64 bits). The apparatus for forwarding packets in this embodiment combines the TCAM table lookup apparatus with the algorithm-based table lookup apparatus, and improves the table lookup performance and reduces the table lookup cost in searching for a long IP address.

The technical solution under the present invention is applicable to looking up a table for an IPv6 address in a router.

Persons of ordinary skill in the art understand that all or part of the steps of the method in the embodiments of the present invention may be implemented by a program instructing relevant hardware. The program may be stored in a computer readable storage medium such as a ROM, a RAM, a magnetic disk or a CD-ROM.

The above descriptions are merely some exemplary embodiments of the present invention, but are not intended to limit the scope of the present invention. Any modifications, variations or replacements that can be easily derived by those skilled in the art shall fall within the scope of the present invention. Therefore, the scope of the present invention is subject to the appended claims.

What is claimed is:

1. A method for forwarding packets, comprising:
    extracting a first group of bits from a destination Internet Protocol (IP) address of a received packet, wherein the first group of bits comprises a predetermined number of bits from the destination IP address;
    searching a Ternary Content Addressable Memory (TCAM) for a TCAM entry that matches the predetermined number of bits from the destination IP address;
    returning an index value from the TCAM entry when the TCAM entry is found that matches the predetermined number of bits;
    combining the index value with a second group of bits from the destination IP address of the received packet to form a key value, wherein the second group of bits includes all bits from the destination IP address that are not included in the first group of bits; and
    searching a random-access memory (RAM) for a preset Forwarding Information Base (FIB) entry according to the key value to obtain a forwarding IP address of the received packet.

2. The method for forwarding packets according to claim 1, wherein the destination IP address comprises a 128-bit IP version 6 (IPv6) address and a 16-bit Virtual Private Network (VPN) identifier.

3. The method for forwarding packets according to claim 1, further comprising:
    forming a second key value that comprises all bits from the destination IP address; and
    searching the RAM for the preset FIB entry according to the second key value when the TCAM entry is not found that matches the predetermined number of bits.

4. The method for forwarding packets according to claim 1, wherein searching the RAM for the preset FIB entry according to the key value comprises searching for the preset FIB entry according to the key value and a Trie algorithm.

5. The method for forwarding packets according to claim 1, wherein searching the RAM for the preset FIB entry according to the key value comprises searching for the preset FIB entry according to the key value and a B-Tree algorithm.

6. The method for forwarding packets according to claim 1, wherein the destination IP address of the received packet comprises a 128-bit IP version 6 (IPv6) address.

7. The method for forwarding packets according to claim 1, wherein the destination IP address of the received packet comprises a predetermined network identifier, and wherein the predetermined network identifier comprises a Virtual Private Network (VPN) identifier.

8. The method for forwarding packets according to claim 7, wherein the destination IP address comprises 128 bits, wherein the predetermined network identifier comprises 16 bits, and wherein a combination of the destination IP address and the predetermined network identifier comprises 144 bits.

9. The method for forwarding packets according to claim 1, wherein the destination IP address comprises a 128-bit IP version 6 (IPv6) address, wherein the predetermined number of bits comprises 64 bits or less, and wherein the index value comprises 16 bits.

10. The method for forwarding packets according to claim 9, wherein the destination IP address further comprises a 16-bit Virtual Private Network (VPN) identifier, and wherein a total number of bits in the destination IP address comprises 144 bits.

11. The method for forwarding packets according to claim 9, further comprising searching for a next-hop IP address of the destination IP address using the 128-bit IPv6 address when the TCAM entry is not found that matches the predetermined number of bits.

12. The method for forwarding data packets according to claim 1, wherein the destination IP address comprises a 128-bit IP version (IPv6) address, wherein the first group of bits comprises a first 64 bits of the 128-bit IPv6 address, wherein the second group of bits comprises a last 64 bits of the 128-bit IPv6 address, and wherein the index value comprises 16 bits.

13. A non-transitory computer readable storage medium comprising instructions, which when executed by a processor, perform steps of:
  extracting a first group of bits from a destination Internet Protocol (IP) address of a received packet, wherein the first group of bits comprises a predetermined number of bits from the destination IP address;
  searching a Ternary Content Addressable Memory (TCAM) for a TCAM entry that matches the predetermined number of bits from the destination IP address and receive an index value from the TCAM entry when the TCAM entry is found that matches the predetermined number of bits;
  combining the index value with a second group of bits from the destination IP address of the received packet to form a key value, wherein the second group of bits includes all bits from the destination IP address that are not included in the first group of bits; and
  searching a random-access memory (RAM) for a preset Forwarding Information Base (FIB) entry according to the key value to obtain a forwarding IP address of the received packet from the preset FIB entry.

14. The non-transitory computer readable storage medium according to claim 13, wherein the instructions further cause the processor to perform a step of searching for the forwarding IP address of the received packet using all bits from the destination IP address when the first search unit does not find the TCAM entry that matches the predetermined number of bits, and wherein the predetermined number of bits comprises half or less than half of the bits from the destination IP address.

15. The apparatus for forwarding data packets according to claim 13, wherein the destination IP address comprises a 128-bit IP version (IPv6) address, wherein the first group of bits comprises a first 64 bits of the 128-bit IPv6 address, wherein the second group of bits comprises a last 64 bits of the 128-bit IPv6 address, and wherein the index value comprises 16 bits.

16. A method for forwarding packets, comprising:
  extracting a first group of bits from a destination Internet Protocol (IP) address of a received packet, wherein the first group of bits comprises a predetermined number of bits that is less than a total number of bits in the destination address of the received packet;
  searching a Ternary Content Addressable Memory (TCAM) for a TCAM entry that matches the predetermined number of bits from the destination IP address;
  returning an index value from the TCAM entry when the TCAM entry is found that matches the predetermined number of bits;
  forming a key value by combining the index value from the TCAM entry with a second group of bits from the destination IP address of the received packet, wherein the second group of bits comprises all bits from the destination IP address that are not included in the first group of bits; and
  searching a random-access memory (RAM) for a preset Forwarding Information Base (FIB) entry using the key value to obtain a forwarding IP address of the received packet.

17. The method for forwarding packets according to claim 16, further comprising searching for the forwarding IP address of the received packet using all the bits from the destination IP address when the TCAM entry is not found that matches the predetermined number of bits.

18. The method for forwarding packets according to claim 16, wherein the destination IP address of the received packet comprises a 128-bit IP version 6 (IPv6) address, and wherein the first group of bits comprises 16 bits, 32 bits, or 64 bits.

19. The method for forwarding data packets according to claim 16, wherein the destination IP address comprises a 128-bit IP version (IPv6) address, wherein the first group of bits comprises a first 64 bits of the 128-bit IPv6 address, wherein the second group of bits comprises a last 64 bits of the 128-bit IPv6 address, and wherein the index value comprises 16 bits.

* * * * *